United States Patent Office 3,402,145
Patented Sept. 17, 1968

3,402,145
THERMALLY STABLE PHENOLIC COMPOSITION WITH INORGANIC PHOSPHORUS-NITROGEN MODIFICATIONS
Minert E. Hull III, Kenmore, and Donald W. Hoch, Buffalo, N.Y., assignors to Hooker Chemical Corporation, Niagara Falls, N.Y., a corporation of New York
No Drawing. Filed Nov. 19, 1962, Ser. No. 238,731
4 Claims. (Cl. 260—54)

The present invention relates to the improved heat resistant plastic compositions and more particularly to greatly improved heat resistant phenol-aldehyde resins. This invention further relates to molding compositions utilizing the improved heat resistant phenol-aldehyde resin.

Plastic materials are based upon combustible carbon compounds and their derivatives, although certain classes, among which are phenol-aldehyde condensate resins, are recognized as being less likely to support combustion and possess greater thermal stability. However, in many present day applications, the thermal stability of phenol-aldehyde resin compounds should be improved if the service life of a molded article is to be satisfactory. The literature cites many methods for increasing fire resistance of resinous compounds including the use of chlorinated paraffin products with or without metallic additives. Such chlorinated products, however, are very susceptible to heat and, at higher temperatures, have decided softening and lubricating effects.

We have now discovered a novel composition of phenol-aldehyde resins which possesses greatly improved thermal stability properties while not yielding any of the desirable characteristics needed for the preparation of molding compounds suitable for molding into useful plastic articles.

Accordingly, it is an object of this invention to provide thermally stable phenol-aldehyde resins. It is another object of this invention to provide molding compositions based upon the resins of this invention. A further object of this invention is ot provide impregnating resin varnishes for fibrous laminated articles. Other objects will also become apparent to those skilled in the art upon reference to the following detailed description and examples.

In accordance with this invention there are provided phenol-aldehyde resins which are based upon cyclic phosphonitrilic polyhydroxy unsaturated aromatics. Commercially, phosphonitrilic halides are a very recent development and even more recent are the polymeric materials based upon the reaction of polyhydroxy unsaturated aromatics with the cyclic phosphonitrilic halides. The phosphonitrilic derived materials are characterized by improved thermal stability and flame retarding properties.

A phosphonitrilic polymer is the reaction product of cyclic trimeric and tetrameric phosphonitrilic chlorides with hydroquinone or other polyhydroxy unsaturated aromatics, wherein the chlorine is replaced by the aromatic. These compounds are graphically illustrated in the trimeric form by Formula 1 and in the tetrameric form by Formula 2 below when the polyhydroxy is hydroquinone and Y is an integer from 1 to 10.

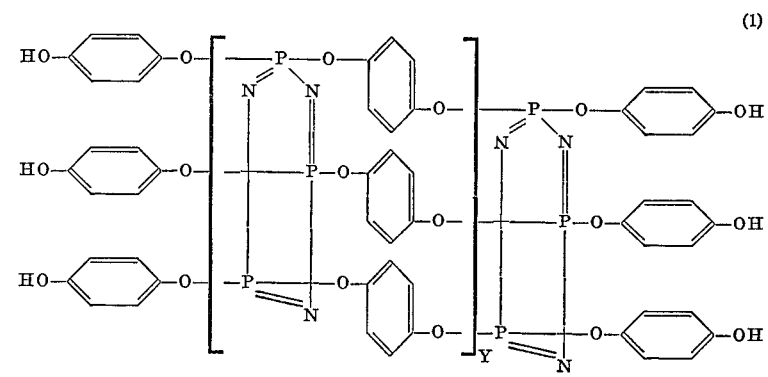

(1)

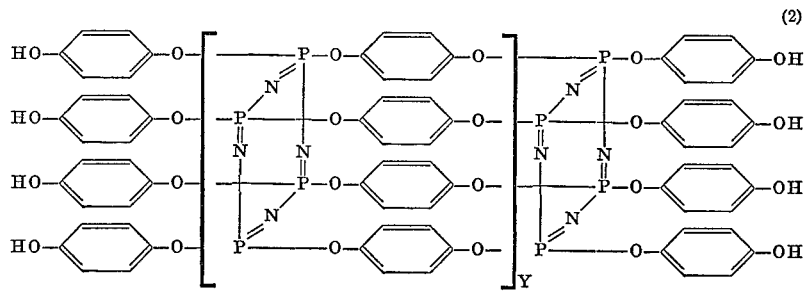

(2)

The above compounds have been found useful in preparing thermally stable phenol-aldehyde condensate resins. Preparations of the phosphonitrilic chloride derivatives are described in Belgian Patent 594,687, issued in 1960 (corresponding United States Ser. No. 820,573, now abandoned). However, the phosphonitrilic polymers employed in our invention contain hydroxy radicals capable of directing the positioning of the methylene linkages on the aromatic groups as will hereinafter be more fully explained.

Preparation of the phosphonitrilic derivatives is accomplished by the reaction of a cyclic phosphonitrile halide, especially chloride, with a polyfunctional organic material, having at least two functional groups each of which is capable of reacting with the halide of the phosphonitrile halide, that is, with $PNZ_2$ where Z is a halide such as chlorine, or bromine, by metathesis, with the elimination of the halogenhydric acid or a halogenated salt. Examples of these functional groups are the hydroxy, mercapto, primary and secondary amino and primary and secondary amido groups. In the preferred practice, the reaction is conducted under suitable conditions to yield the halogenhydric acid as elimination product, and, in such case, the reaction is conducted in the presence of an acceptor of the halogenhydric acid, preferably a tertiary amine capable of forming a salt with the halogenhydric acid formed in the condensation reaction. The condensation product thus produced is in the form of a new polymeric chain containing recurrent PN nuclei, thus maintaining the initial cyclic structure of the cyclic phosphonitrile halide, as will be discussed more fully hereafter.

The presence of an acceptor of halogenhydric acid or an acceptor of HCl such as a tertiary amine causes the formation of a salt with the halogenhydric acid produced in the condensation reaction, and prevents the formation of a free halogenhydric acid during the preceding condensation reaction, thus preventing this free halogenhydric acid from reacting with the intermediary product or products formed in the condensation reaction, which might otherwise lead to the formation of a product in which the cycle is broken.

It is preferable to conduct the condensation reaction under such conditions which facilitate obtaining a controlled minimum percentage of chlorine in the reaction product, of between 0 and 10% of chlorine by weight of polymer, usually less than 5% of chlorine. The latter can be obtained by using at least one mole of polyfunctional material per mole of phosphonitrile chloride, calculated in $PNCl_2$. However, even when one uses quantities of polyfunctional material greater than the molar ratio 1:1 with respect to $PNCl_2$, the polymer can contain residual chlorine, because the quantity of residual chlorine depends also (1) on the solvent used in the reaction, (2) on the concentration of reagents in the solvent, and (3) on the reflux time. However, the presence of a non-substituted chlorine atom in the final product according to the invention does not prevent the preservation of the P—N cyclic structure in the final product.

The particular type of solvent used and the quantity of solvent employed also affect the molecular weight of the polymer as well as the chlorine content.

The condensation products of the invention have several recurrent groups of the formula:

(3)    $(A—X—B—X)_n$ in which A represents a member of the group comprising the nuclei

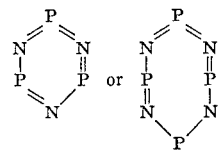

B is aromatic, X is oxygen, and $n$ is a whole number of at least 2, for example from 2 to 15 or more, preferably from 2 to 7. The condensation product can contain chlorine, for example bound to one or several atoms of P or one or several A groups.

The preferred products are those formed by the reaction of cyclic phosphonitrile chloride, in particular the trimer or the tetramer or their mixtures, with the polyhydroxylated compounds described below, in the presence of an hydrochloric acid. In the reaction conditions used, as previously cited, it has been found that the opening of the nucleus of trimer or tetramer of phosphonitrile chloride does not occur during the condensation reaction, and that the polymer condensation product is in the form of a chain having cyclic nuclei containing recurrent cycles, for example trimers and/or tetramers PN, in which preferably the greater proportion or nearly all or all of the chlorine atoms in the nuclei have been replaced by the residues of the polyfunctional materials in which a hydrogen atom of at least one of the functional groups of the polyfunctional material has been eliminated, one or several phosphorus atoms in each nucleus containing PN being bound by units of the polyfunctional residue to the adjacent phosphorus atoms in the adjacent PN cyclic nuclei. In other words, these condensation products are composed of a chain of trimer and/or tetramer cyclic nuclei, each of these nuclei being bound to one or to a pair of adjacent cyclic nuclei by pairs of adjacent phosphorus atoms, by at least one, and usually by several, for example from 2 to 8, polyfunctional residues binding each a pair of these adjacent phosphorus atoms in each of these residues of the bond, a hydrogen atom of each of the two functional groups having been eliminated.

When all the chlorine atoms are not eliminated during the condensation reaction and when a certain number of residual chlorine atoms remain attached to the phosphorus in the cyclic nucleus containing PN, some of the polyfunctional residues, for example, the hydroquinone residues, can react only partially by one of their two polyfunctional groups with one of the chlorine atoms on a phosphorus atom, the rest of the hydroxy group remaining unchanged. In this case, the aromatic residue does not bind a pair of nuclei containing PN and there is only a single substitution of one of the chlorine atoms by the p-hydroxyphenoxy radical, as illustrated by the formula below, with respect to the trimer of phosphonitrile chloride.

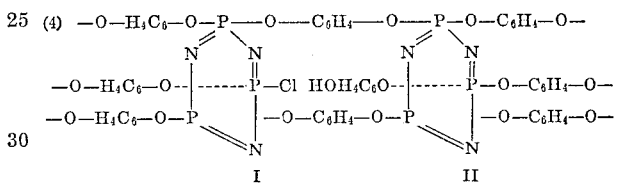

It was previously noted that the nuclei I and II could be bound by only two phenylenedioxy groups and in appropriate circumstances a single phenylenedioxy group can bind a pair of such nuclei. When all the chlorine atoms are substituted, all the phosphorus atoms of a cyclic nucleus can be bound by phenylenedioxy residues to the phosphorus atoms of the adjacent nuclei.

When a mixture of trimer and tetramer of phosphonitrile chloride is used, the condensation product contains a mixture of nuclei $P_3N_3$ and $P_4N_4$ in the polymer chain.

It should be noted that according to the preceding Formulas 1, 2, and 3, that (a) the cyclic nucleus present in the trimer or the tetramer of phosphonitrile chloride is preserved in the condensation product, (b) a substantial proportion of the chlorine atoms bound to the phosphorus atoms in the trimer or tetramer starting material is replaced by polyfunctional units, one or several of the latter binding the phosphorus atoms on the adjacent nuclei, and (c) the free hydroxyl groups are present as terminal hydroxyl groups and also some intermediate free hydroxyl groups can be present. See Formula 3. The presence of non open phosphonitrile cyclic nuclei in the polymer condensation products has been confirmed by experimental data on infrared absorption, showing the characteristic absorption bands for the PN nuclei in the condensation product, as previously observed.

All the cyclic phosphonitrile halides or mixtures of halides of this type, can be used as starting material. This includes for example cyclic phosphonitrile chloride, bromide, fluoride, iodide, or the mixed halides, for example the cyclic phosphonitrile chlorobromides. The cyclic phosphonitrile chloride and bromide, for example trimer or tetramer, and the mixed chlorobromides are the preferred starting materials, the chloride being particularly useful and desirable.

One can use also various polyhydroxylated aromatic compounds or polyalcohols such as hydroquinone, tetrachlorohydroquinone, the bisphenol-A having the formula

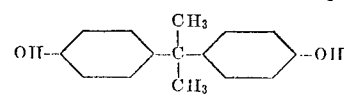

phloroglucinol, pyrogallol, resorcinol, toluhydroquinone, diphenol acid, 1,4-dihydroxy-naphthalene, and its isomers 1,5-, 1-6- and 1,8-, the tri-hydroxynaphthalenes and analogs and other substituted derivatives of these compounds as well as mixtures thereof.

It has been found that for the purpose of producing condensation products, particularly of the type illustrated by Formulas 1, 2, 3, and 4 in which most or all the chlorine atoms of the cyclic material of the phosphonitrile chloride such as the trimer or tetramer are replaced by polyfunctional units, it is preferable to use at least two moles of the polyfunctional compounds per mole of $PNCl_2$ in the starting material, usually the excess being less than 50%. In other words, it is preferable to use at least 6 moles of the polyfunctional material per mole of $(PNCl_2)_3$ and at least about 8 moles of the polyfunctional reactive per mole of $(PNCl_2)_4$. When mixtures of these materials are used, the quantity of the polyfunctional compounds used depends on the relative proportions of $PNCl_2$ trimer and tetramer in the mixture. In practice, however, a quantity of polyfunctional reagent above 2 moles per mole of $PNCl_2$ in phosphonitrile chloride is preferable.

Although the molar proportions of the polyfunctional compound to phosphonitrile chloride calculated in $PNCl_2$, used in the condensation reaction may be below 2:1, and may be as small as 1:1, the products obtained under these conditions are generally only partially soluble in organic solvents such as ketones and are not as useful as those which are of greater solubility therein.

Examples of phenols which may be used in preparing phenol-aldehyde condensates for use in practicing the invention include phenol itself and substituted phenols having the following general formula:

(5)

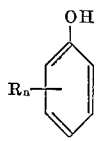

where R may be H, F, Cl, Br or a suitable substituent selected from the following:

(a) Alkyl groups of 1 to 18 carbon atoms in any of their isomeric forms and substituted on the phenolic nucleus in the ortho-, meta- or para-positions;
(b) Alicyclic groups of 5 to 18 carbon atoms such as cyclohexyl, cyclopentyl, methyl cyclohexyl, butyl-cyclohexyl, and so forth;
(c) Aromatic or arakyl groups of 6 to 18 carbon atoms such as penol, alpha-methyl benzyl, benzyl, cumyl, and so forth;
(d) Alkyl, alicyclic, aryl and aralkyl ketones wherein the hydrocarbon portion is as defined hereinbefore.
(e) Alkyl, alicyclic, aryl and aralkyl carboxylic groups wherein the hydrocarbon portion is as defined hereinbefore, and $n$ is an integer from 1 to 3 provided a minimum of 2 ortho-para-positions do not contain R.

Suitable substituted phenols include the following: para-tertiary-butylphenol, para-secondary - butylphenol, para-tertiary hexylphenol, para-isooctyl-phenol; para-phenylphenol, para-benzylphenol, para-cyclohexylphenol, para-decyl - phenol, para - dodecyl - phenol, para-tetra-decyl-phenol, para-octa-decyl-phenol, para-nonyl-phenol, para-methyl - phenol, para-beta-naphthyl-phenol, para-alpha-naphthyl - phenol, para-pentadecyl-phenol, para - cetyl-phenol, para-cumyl phenol, para-hydroxy acetophenone, para-hydroxy benzophenone, a phenol alkylated with limonene, a phenol alkylated with oleic acid, as well as the corresponding ortho and meta derivatives such as meta-butyl phenol and ortho-butyl phenol, as well as mixtures thereof.

From the foregoing, it is apparent that substantially any phenol may be used in practicing the present invention, provided that it has a reactive phenolic hydroxyl group and is capable of reacting with aldehydes such as formaldehyde to produce a condensate. The pure refined phenols may be used, but this is not necessary. For instance, phenols may be alkylated and then reacted with an aldehyde as the crude phenolic product, which may contain some polyalkylated as well as non-alkylated phenols. Mixtures of phenols mentioned herein also may be used.

In producing the parent phenol-aldehyde condensates, any suitable aldehyde or mixtures of aldehydes capable of reacting with a phenol and having from one to twelve carbon atoms is satisfactory provided it does not contain a functional group or structure which is detrimental to the resinification reaction or interferes with esterification or oxyalkylation of the resin. The preferred aldehyde is formaldehyde, which may be in aqueous solution or in any of its low polymeric forms such as paraform or trioxane. Other examples of aldehyde include para-aldehyde, furfural, 2-ethyl-hexanal, ethylbutyraldehyde, heptaldehyde, glyoxal, and so forth.

The phosphonitrilic polyhydroxides phenol aldehyde condensate should be soluble in organic solvents such as acetone or alcohol and it should not be advanced to the insoluble phenolic "C" stage or resite stage. When the phenol is phenol itself and the aldehyde is formaldehyde, a species of this invention may be exemplified by the following formula, when using a trimeric phosphonitrilic hydroquinone starting material, Y being an integer from 1 to 10:

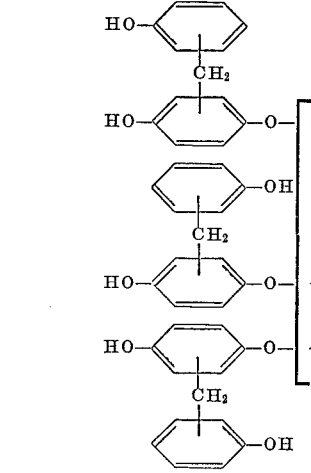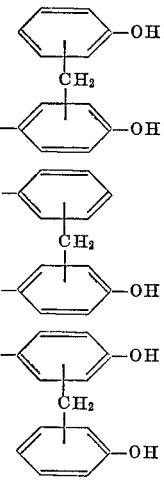

(6)

Preferably, the phenol-aldehyde condensate is a novolac, i.e., a linear plastic formed under acid conditions. A novolac is deficient in methylene linkages and therefore is permanently fusible. The addition of a methylene link donor such as hexamethylene tetramine and heat will advance the resin to the insoluble permanently set phenolic "C" stage.

Any small random residue amount of chlorine which may be present in the original phosphonitrilic polyhydroxide material is removed by the substitution of phenol, and hydrogen chloride is formed. In such cases, of course, there is no further attachment of phenol via methylene linkages of the aldehyde. Then phenol residue in such cases functions as a chemically bound plasticizer to make the resulting resin more flexible. This plasticizer effect is not lost by volatilization as in ordinary plasticizers admixed with phenolic resins. Furthermore, in some applications, this quality is very desirable, as for example, in molding complex shapes, which requires the use of plasticizers to aid mold flow.

The proportion of aldehyde to be condensed with the phenol may be varied to prepare novolacs of varying molecular weights and the viscosity of the finished resin may be controlled by the mole weight of the novolac. Preferably, the amount of aldehyde varies from 0.5 to 1.0 mol per mol of the phenol when a mono or difunctional phenol is used. In instances where a trifunctional phenol is used, the preferred upper limit of aldehyde may be about 0.85 mol per mol of phenol so as to prevent formation of insoluble and infusible condensates.

When a novolac is prepared using the above-described ratios of aldehyde to phenol, it is preferred that the aldehyde and phenol be reacted using an acid catalyst such as sulfuric, hydrochloric or oxalic acid, but basic catalysts also may be used. In some instances, catalysts may not be necessary. Examples of alkaline catalysts include ammonia, amines, alkali earth and quaternary ammonium bases. Wetting agents of the anionic types such as sodium alkyl aryl sulfonate, may speed up the reaction when weak acids are used and also may be present.

The phenol aldehyde type resin is prepared by charging the desired phosphonitrilic polyhydroxy aromatic, phenol and aldehyde raw materials and catalyst in selected proportions into a reaction vessel. The reaction then proceeds under conditions of temperatures from zero to 150 degrees centigrade at pressure from atmospheric to 100 pounds per square inch for a suitable time, e.g., one and one-half hours, until the desired degree of condensation has taken place. Thereafter excess reactant, water, etc., is removed and the molten resin discharged from the vessel.

The resin is then ground to desired particle size and the desired amount of methylene link donor material such as hexamethylene-tetramine admixed. The basic resin is now ready for use in molding compounds and varnishes.

The use of fillers with the compounds of this invention is optional and dependent upon the final properties desired of the article being molded. Such fillers may be one or more of the following: glass, quartz, mica, asbestos, graphite, coloring matter and others. The Technology of Plastics and Resins, Mason, J. P., and Manning, J. F., Van Nostrand Company (1945), at page 396 et seq., describes other fillers and reasons such as change of gravity, cost or chemical resistance for their use in phenol-aldehyde resins.

Although many formulations within the invention may be made, a typical thermoset molding powder recipe may be represented as follows:

*Basic resin, 40–90%.*—Generally only 40–50% of the basic resin is necessary, though in rare cases more than 90% of the basic resin may be employed.

*Filler, 35–50%.*—Material in powder or fiber form such as quartz, graphite, carbon, silica, asbestos, or mica is added for purposes of extending the resin and modifying the properties of the finished product.

*Plasticizer, 5%.*—Particularly valuable for aiding flow into the mold.

*Lubricant, 1%.*—This modifying agent is added particularly to prevent sticking to the mold surface. Typical lubricants are stearic acid, stearates and beeswax.

*Pigment or dye, 1%.*—The resins of this invention may also be advantageously employed in making laminated articles. Fundamentally, the technique is one of impregnation of a porous sheet filler, followed by shaping and compressing of the stacked sheets. The resin is applied to the porous sheet filler in the form of a varnish using a solvent such as alcohol. The viscosity should be low enough to provide ample impregnation of the filler, but the solids content should not be reduced to a point where insufficient solid resin is left in the filler. The resin content in the filler may be varied widely, as within 20 to 70 percent range. After impregnation, the volatile constituents of the varnish are driven off until only a small proportion remains. The remaining portion facilitates final shaping. The combined resin sheet is now ready for plying up, shaping, and curing. The operations from this point will depend upon the shape which is desired. Flat articles, tubes, and containers are among the shapes which may be made.

The fillers employed with the varnish resins of our invention should be heat resistant if the resins are to be fully utilized. Suitable fillers are tapes, cloth, papers, fibers and powders, preferably of asbestos, silica, carbon, graphite, or other equivalent or similar heat resistant fibers. The term silica includes fabricated forms of silica such as glass fibers, glass roving, or glass fabric plus the acid leached form of each of these containing 95% or more $SiO_2$.

The practice of this invention is illustrated by, but not limited by, the examples given below which describe preferred forms thereof.

EXAMPLE 1

A resin having the typical analysis shown below was used as the phosphonitrilic polyhydroxyl aromatic in this example. The resin is manufactured under Belgian Patent 594,687.

| Typical analysis: | Percent by wt. |
|---|---|
| Chlorine | 0.1 to 2.2 |
| Hydroxyl | 8.0 to 9.5 |
| Carbon | 48 to 52 |
| Phosphorus | 13 to 16 |
| Nitrogen | 5.5 to 7.5 |
| Hydrogen | 3.0 to 4.5 |

A charge of 160 parts of the above phosphonitrilic polyhydroxyl aromatic resin was dissolved in 800 parts of U.S.P. phenol at 70–80 degrees centigrade, 8 parts of 98 percent sulphuric acid were added, heated to 95 degrees centigrade and then 520 parts of 37 percent formalin solution were added subsurface at 95–100 degrees centigrade over a one hour period. The solution was refluxed 20 minutes or to less than 0.5 percent free formaldehyde. A slurry of 8 parts slaked lime and 16 parts of water at 80–90 degrees centigrade was added. Vacuum was applied and solution dehydrated at 80–90 degrees centigrade until water ceased to distill off. Thereafter, 600 parts isopropyl alcohol was added at 80–85 degrees centigrade under reflux. Varnish was cooled to room temperature and discharged into a suitable container. Yield—1965 parts of a resin varnish having a viscosity of 550 centipoises at 25 degrees centigrade, a refractive index of 1.5155, and a solids content of 56.6 percent using A.S.T.M. method.

EXAMPLE 2

Instead of the procedure of Example 1, the resin was vacuum dehydrated as above and discharged into metal pans to cool. A brittle resin is obtained which has a capillary melt of 70–80 degrees centigrade. This resin is a typical novolac and is permanently fusible.

In the following example the phosphonitrilic polyaromatic-hydroxide contained chlorine bound to the PN nucleus. In such cases, an additional step is required to remove the chlorine by metathesis prior to the condensation of phosphonitrilic polyaromatic-hydroxide with phenol.

EXAMPLE 3

Phosphonitrilic polyhydroxyl aromatic resin described in Example 1 (285 parts) was dissolved in 1000 parts of U.S.P. phenol and warmed to from 70 to 90 degrees centigrade. The solution was heated to 180–182 degrees centigrade and maintained at this temperature for 5 hours. Thereafter, the solution was cooled to about 95 degrees centigrade and 6 parts of oxalic acid dissolved in 12 parts of water were added. Thereafter, 685 parts of 37 percent formalin solution were added subsurface at 95 to 100 degrees centigrade and the solution was refluxed until less than 1 percent of free formaldehyde remained. Vacuum was applied until a temperature of 170 degrees centigrade. After subsequent cooling to about 80 degrees centigrade, sufficient alcohol was added to make a varnish having an approximate total solids content of 60 percent. The varnish was cooled to room temperature and discharged into a suitable container. The resin varnish obtained had a viscosity of 306 centipoises at 25 degrees centigrade, a refractive index of 1.5145 and a solids content of 57.4 percent.

The finished resin contained 0.80 percent nitrogen on the resins solid as tested by the Kjeldahl method. There was no detectable chlorine when analyzed by the Volhard method.

EXAMPLE 4

The resin of Example 2 (60 parts) was dissolved in 100 parts of denatured ethyl alcohol at 25 degrees centigrade, 12 parts of hexamethylene tetramine were added and mixed until dissolved. To this solution was added 73 parts of silica fibers, prepared from acid-leached glass fibers and testing 98% silica content or higher, in a sigma-blade mixer. After this composition was well mixed, 3 parts of zinc stearate and 6 parts of slaked lime were added and mixed until well dispersed. The final mixture was a coarse granular product. The alcohol was removed by drying with 100–120 degrees Fahrenheit forced air in trays or other suitable means. The dried product contains 2–4 percent volatiles when a test sample was heated at 320 degrees Fahrenheit in an oven for 15 minutes.

The dried product was molded into standard ASTM (Method D-790) ¼ inch x ½ inch x 5 inch bars and tested for flexural strength and weight loss. The bars were prepared by molding at 1000–2000 pounds per square inch and curing 10–15 minutes at 320–340 degrees Fahrenheit. These bars were removed from the mold and postcured 2 hours at 300 degrees Fahrenheit, 2 hours at 350 degrees Fahrenheit, 2 hours at 400 degrees Fahrenheit, 2 hours at 450 degrees Fahrenheit, and 16 hours at 500 degrees Fahrenheit. At this point, representative bars were tested and showed a flexural strength of 9650 pounds per square inch with a 4.9 percent weight loss. After additional heating for 24 hours at 700 degrees Fahrenheit, bars were tested and had an average flexural strength of 8070 pounds per square inch and a total weight loss of 14.5 percent.

EXAMPLE 5 (COMPARATIVE)

A typical novolac was prepared by heating to 95 degrees centigrade 200 parts of phenol and 2 parts of sulfuric acid and thereafter adding subsurface 134 parts of formalin. Refluxing was continued after the addition until there is less than 0.5 percent of free formaldehyde. Then 2 parts of slaked lime and 4 parts of water were added to neutralize the reaction. The resin was vacuum dehydrated and poured into pans to cool. The resin melting point is 75 to 80 degrees centigrade.

EXAMPLE 6 (COMPARATIVE)

A molding composition was prepared from the resin in Example 5 following the procedure of Example 4. The composition was molded and tested in the same manner as in Example 4. At the end of the 500 degrees Fahrenheit conditioning, the molded bars have average flexural strength of 9400 pounds per square inch and a 4.6 percent weight loss. After additional heating for 24 hours at 700 degrees Fahrenheit, bars were tested and found to have a total weight loss of 24.2 percent and a flexural strength of 2080 pounds per square inch.

EXAMPLE 7

A molding compound was prepared, using the process of Example 4 and a mixture of 700 parts of silica fiber and 1000 parts of a one-stage phenolic resin meeting military specification MIL–R–92–99, dissolved in alcohol and the varnish has 62% resin solids. This resin is commercially sold as a high heat resistant resin. At the end of the 500 degree Fahrenheit conditioning, the molded bars have a flexural strength of 11,500 pounds per square inch and a weight loss of 5.9 percent. After additional heating for 24 hours at 700 degrees Fahrenheit, bars were tested and found to have a flexural strength of 5530 pounds per square inch with a total weight loss of 12.6 percent.

Generally one expects a very high drop off or decrease in retained flexural strength when a molding composition is exposed to high temperatures for prolonged periods. The typical phenol-formaldehyde resin of Examples 5 and 6 shows characteristic behavior with a decrease of 78 percent to a low of 2080 pounds per square inch. Likewise, a special resin for high heat applications as shown in Example 7 decreased 52 percent to a low of 5530 pounds per square inch. Therefore, it was quite surprising to note that our invention decreased only 16 percent and had a retained strength of 8070 pounds per square inch. Thus, our invention has greatly improved thermal stability as evidenced by the low rate of flexural strength decrease. The high retained actual strength and small amount of charring of organic matter after severe heat exposure is exceptional.

The unusual thermal stability of our discovery makes the invented products well suited for use wherever heat resistance is advantageous as in auto mufflers, commercial heat resistant products, missiles and aerospace applications.

Various changes and modifications may be made and equivalents may be substituted in the method and composition of this invention, certain preferred forms of which have been herein described, without departing from the scope of this invention. Such modifications are to be regarded as within the scope of the invention.

What is claimed is:

1. A copolymer comprising (A) phenol and (B) a cyclic phosphonitrilic hydroxylated aromatic composition which are (C) linked together by methylene and alkyl substituted methylene radicals, said cyclic phosphonitrilic hydroxylated aromatic composition being the condensation product of a cyclic phosphonitrilic halide of the formula $(PNZ_2)_n$, wherein Z is selected from the group consisting of chlorine and bromine, and $n$ is from 3 to 4, with a compound selected from the group consisting of hydroquinone, resorcinol, pyrocatechol and mixtures thereof and being condensed so as to contain from 1 to 10 repeating cyclic phosphonitrilic nuclei.

2. A condensation product comprising the residues of (A) cyclic phosphonitrilic hydroxylated aromatic composition, which is the condensation product of a cyclic phosphonitrilic halide of the formula $(PNZ_2)_n$, wherein Z is selected from the group consisting of chlorine and bromine, and $n$ is from 3 to 4, with a dihydroxy aromatic compound, condensed so as to contain from 1 to 10 repeating cyclic phosphonitrilic nuclei, (B) phenol, and (C) an aldehyde.

3. A process for preparing a thermally stable condensation product by (A) dissolving a cyclic phosphonitrilic hydroxylated aromatic composition in a solution of phenolic hydroxylated aromatic compound and catalyst; said composition being the condensation product of a cyclic phosphonitrilic halide of the formula $(PNZ_2)_n$, wherein Z is selected from the group consisting of chlorine and bromine, and $n$ is from 3 to 4, with a dihydroxy aromatic compound, condensed so as to contain from 1 to 10 repeating cyclic phosphonitrilic nuclei, (B) heating the solution to a temperature between about 0 and 150 degrees centigrade while (C) slowly adding an aldehyde and continuing (D) heating until substantially all the free aldehyde has been consumed.

4. A process for preparing a thermally stable phenolic condensation product by (A) dissolving a cyclic phosphonitrilic hydroxylated aromatic composition in a solution of phenolic hydroxylated aromatic compound and an acid catalyst; said composition being the condensation product of a cyclic phosphonitrilic halide of the formula $$(PNZ_2)_n$$

wherein Z is selected from the group consisting of chlorine and bromine and $n$ is from 3 to 4, with a dihydroxyaromatic compound, condensed so as to contain from 1 to 10 repeating phosphonitrilic nuclei, (B) heating the solution at a temperature from about 0 to about 150 degrees centigrade while (C) slowly adding from about 0.5 to about 1.0 moles of aldehyde per mole phenolic hydroxyl and continuing (B) heating until substantially all of the free aldehyde has been consumed.

References Cited

UNITED STATES PATENTS

| | | | |
|---|---|---|---|
| 2,866,773 | 12/1958 | Redfarn | 260—47 |
| 3,121,704 | 2/1964 | Rice et al. | 260—54 |
| 3,194,787 | 7/1965 | Redfarn et al. | 260—47 |

FOREIGN PATENTS

| | | |
|---|---|---|
| 1,270,800 | 7/1961 | France. |

WILLIAM H. SHORT, *Primary Examiner.*

H. E. SCHAIN, *Assistant Examiner.*